United States Patent [19]

Revol et al.

[11] Patent Number: 5,059,073
[45] Date of Patent: Oct. 22, 1991

[54] PEG FOR ANCHORING IN A HOLE WITH AN UNDERCUT PORTION

[75] Inventors: Gérard Revol, Chateaudouble; Jean-Paul Barthomeuf, Alixan Village, both of France

[73] Assignee: Societe de Prospection et d'Inventions Techniques (S.P.I.T.), Cedex, France

[21] Appl. No.: 532,535

[22] Filed: Jun. 4, 1990

[30] Foreign Application Priority Data

Jun. 1989 [FR] France .................. 89 07513

[51] Int. Cl.⁵ .................. F16B 13/06; F16B 19/00
[52] U.S. Cl. .................. 411/65; 411/82; 411/342; 411/508; 411/913
[58] Field of Search .................. 411/54, 53, 65, 66, 411/342, 508, 509, 510, 913, 82, 63, 64

[56] References Cited

U.S. PATENT DOCUMENTS

| | | | |
|---|---|---|---|
| 4,245,545 | 1/1981 | Freeman | 411/342 |
| 4,402,639 | 9/1983 | Kessler | 411/65 |
| 4,500,239 | 2/1985 | Liebig | 411/65 |
| 4,657,212 | 4/1987 | Gilmore et al. | 411/342 |
| 4,714,391 | 12/1987 | Bergner | 411/54 |

Primary Examiner—Neill R. Wilson
Attorney, Agent, or Firm—Schwartz & Weinrieb

[57] ABSTRACT

A peg for anchoring within a hole having an undercut portion comprises a body (1) with an external end (5) for mounting an element thereon and a tapered internal end (11) widening out towards the inside of the hole, a locking ring (2) formed from segments disposed about the body and intended to pivot within the undercut portion (10). The external diameter of the ring (2) is equal to that of the hole (8). Means (4,14,19) for temporarily immobilizing the segments of the ring are mounted upon the body. Means fixed upon the body may drive the ring (2) into the vicinity of the undercut portion of the hole and radially acting means (4) may cause the segments of the ring (2) to pivot into the undercut portion. A resilient annulus (4), by means of force exerted radially inwardly upon the ring (2), ensures the double function of pivoting the segments of the ring (2) and, prior thereto, temporary axial immobilization thereof in combination with a collar (3), which is provided in accordance with one embodiment of the present invention, for temporarily preventing the pivoting function.

13 Claims, 3 Drawing Sheets

PEG FOR ANCHORING IN A HOLE WITH AN UNDERCUT PORTION

FIELD OF THE INVENTION

The present invention relates to a peg for mounting an element upon a receiving material by anchoring the peg within an undercut hole drilled within the material, comprising a body with an external end for securing the element thereon and a tapered internal end widening out towards the inside of the hole, a locking ring comprising segments disposed about the body and intended to pivot within the undercut portion of the hole and be locked therein by means of the internal bell-shaped end of the body, the external diameter of the ring being substantially equal to that of the hole, means for temporarily axially immobilizing the segments of the ring upon the body, means mounted upon the body for translatably driving the ring into the undercut portion of the hole and radially acting means for causing the segments of the ring to pivot radially outwardly into the undercut portion of the hole.

BACKGROUND OF THE INVENTION

Pegs of the aforenoted type are used for mounting parts within or upon a stressed zone of construction material, such as for example the under face of a concrete slab. More particularly, these pegs are provided for remaining sufficiently anchored even if a crack forms within the anchored reception zone of the construction material.

Such a peg is taught by means of the patent document US-A-2 181 657. A peg of a similar type, but not identical, is taught by means of the patent application document EP-A-0 015 305. These prior art pegs have drawbacks, essentially related to the complexity of their manufacture. The first one has a locking ring whose segments require numerous machining operations. The second one requires a spacer and a prestressed locking ring.

OBJECT OF THE INVENTION

The aim of the present invention therefore, is to simplify the pegs of the prior art.

SUMMARY OF THE INVENTION

To this end, the present invention relates to a peg of the above mentioned type, characterized by the fact that it comprises resilient means adapted so as to provide, by means of an action exerted radially upon the body and the ring, the double function of pivoting of the segments of the ring and, prior thereto before, temporary axial immobilization thereof in combination with means adapted for temporarily preventing the pivoting function thereof.

In accordance with a first embodiment of the peg of the invention, means for preventing the pivoting function of the resilient means are mounted about the body of the peg and are adapted, so as to cooperate, under the action of the resilient means, radially with the ring during its immobilization function and to be detached therefrom under the combined action of the edge of the anchorage hole and the means for driving the ring in translation.

In this case, the locking ring comprises an internal portion, disposed about a reduced diameter portion of the body of the peg and of the same internal diameter as the narrowed body portion, extended axially by means of an external portion having an internal diameter greater than the diameter of the peg body and forming a skirt upon the external surface of which is formed a groove receiving a resilient annulus; and a collar, having an internal skirt, is mounted about the peg body so as to bear, first of all against the skirt of the ring, with its skirt inserted between the peg body and the skirt of the ring, and thus allow the resilient annulus to ensure its immobilization function and then against the edge of the anchorage hole so that the ring can be detached from the collar under a action of the shoulder formed by means of the reduced diameter portion of the peg body.

In accordance with a second embodiment of the peg of the invention, the resilient means is mounted about the locking ring and is movable relatively thereto from an internal immobilization position to an external pivoting position, the locking ring and the resilient means being adapted so that the anchorage hole temporarily holds the resilient means in its immobilized position.

In this case, the means for driving the ring in translation as far as the undercut portion comprises a stop washer mounted upon the peg body, in abutment against the external end of the ring.

In this case the locking ring may comprise an internal portion disposed about the peg body and of the same internal diameter as that of the external diameter of the peg body, axially extended by means of an external portion having an internal diameter greater than the external diameter of the peg body and forming a skirt upon the external surface of which is formed a groove receiving a resilient annulus when at its pivoting position, the internal portion of the ring further comprising external annular reduced diameter shoulder means for receiving the resilient annulus in when at its immobilized position.

In this latter case, the means for receiving the resilient annulus at its immobilized position may comprise an annular shoulder connected to the groove of the skirt by means of the external surface thereof and the thickness of the annulus is greater than the difference of defined between the diameters of the external surfaces of the internal portion of the ring and of its skirt.

In this same latter case, the external surface of the locking ring may have a constant diameter and comprise a fine groove for receiving the resilient annulus at its immobilized position.

BRIEF DESCRIPTION OF THE DRAWINGS

Various other objects, features, and attendant advantages of the invention will be better understood from the following description of several embodiments of the peg of the invention with reference to the accompanying drawings in which like reference characters designate like or corresponding parts throughout the several views, and wherein.

DESCRIPTION OF THE PREFERRED EMBODIMENTS

Figure 1:
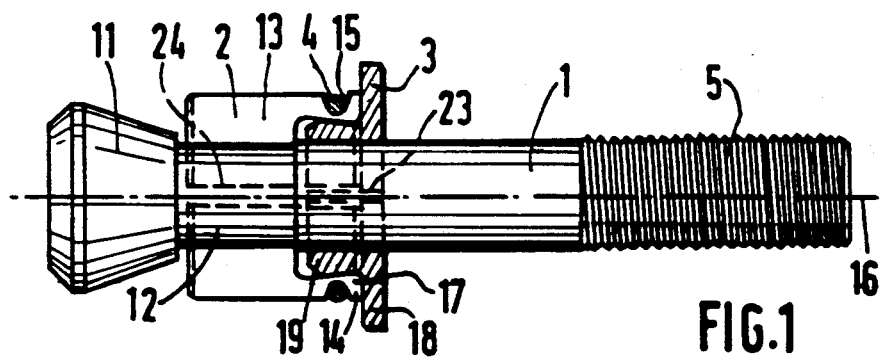
FIG. 1 is a view partially in longitudinal section of a first embodiment of the peg of the invention.

Referring to FIGS. 1 to 4, the peg of the invention comprises a body 1, a locking ring 2, an immobilization collar 3 and a resilient annulus 4.

Body 1 is formed with a shank having one externally threaded end intended to receive a locking nut 6 (FIG. 4) as well as a nut (not shown) for fixing an element to be mounted upon a supporting material 7 within which an anchorage hole 8 has been bored. The anchorage hole 8 is bored with, short of its bottom 9, an undercut portion 10 widening out towards the bottom end 9 of the hole.

Body 1 is also provided with a tapered internal end 11 widening out in the opposite direction with respect to the external end of the body, or in the same direction as the undercut portion 10. Between the two ends 5, 11 of the peg body, a shank portion 12 of slightly reduced diameter extends adjacent to the tapered end 11.

Ring 2, formed of several elements conferring thereon an annular character, comprises an internal portion 13 having the same internal diameter as the external diameter of the narrowed shank 12 of the peg body and an external portion 14 whose internal diameter is greater than the diameter of the peg body and forms a skirt with respect to internal portion 13. The external diameter of ring 2 is substantially equal to the diameter of hole 8, and in fact is very slightly less.

Upon the external surface of skirt 14 there is formed a groove 15 for receiving the resilient annulus 4 which tends to urge the lugs of the constituent elements of the ring forming the skirt 14 towards axis 16. In actual fact, the internal diameter of skirt 14 is not quite constant and it decreases slightly from its internal end adjacent the internal portion 13 of the ring towards its free external end 17. Collar 3 comprises a washer 18 axially extended by means of an internal skirt 19. The internal diameter of collar 3 is equal to that of the peg body. The external diameter of washer 18 is greater than the diameter of the anchorage hole 8. The external surface of skirt 19 is complementary to the internal surface of skirt 14 of ring 2 and the axial length of skirt 19 of the collar is slightly smaller than that of the skirt 14 of the ring 2.

The operation of the peg which has just been described will now be explained.

First of all, during storage and handling of the peg, skirt 19 of collar 3 is inserted between the peg body 1 and skirt 14 of the locking ring, washer 18 bearing against the free end 17 of skirt 14. The radial action of the resilient annulus 4 upon the lugs of skirt 14 of the ring is applied indirectly to skirt 19 of collar 3 so as to temporarily hold the assembly immobilized radially and axially upon the peg body. It will be noted that the positive cooperation between the two skirts 14, 19 combined with the radial action of the resilient annulus 4 prevent the ring and the collar from separating too readily and so enhances the immobilization function of the resilient annulus 4.

It will be further noted that portion 3, because of its skirt 19 disposed internally within annular skirt portion 14 of ring 2, temporarily prevents the resilient annulus 4 from causing the segments of ring 2 to pivot.

Figure 2:
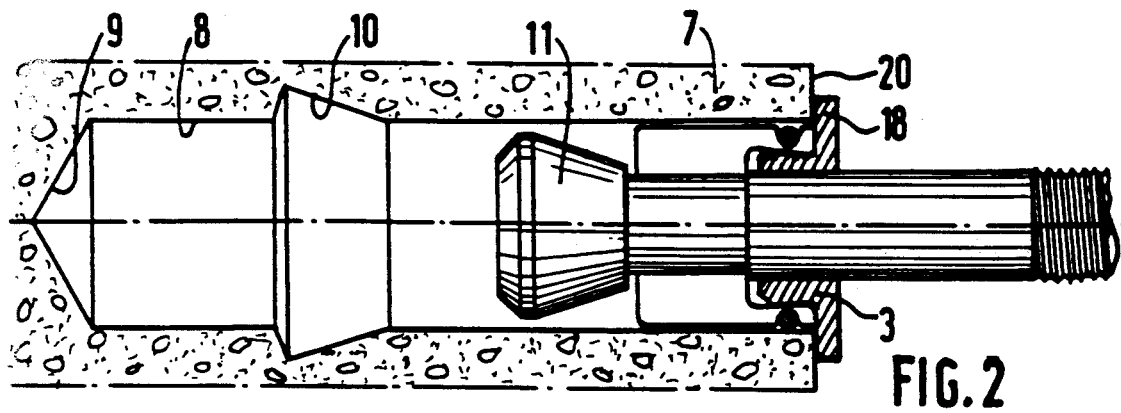
FIG. 2 is a view of the peg of FIG. 1, after its introduction into an anchorage hole, its collar abutting against the edge of this hole.
Figure 3:
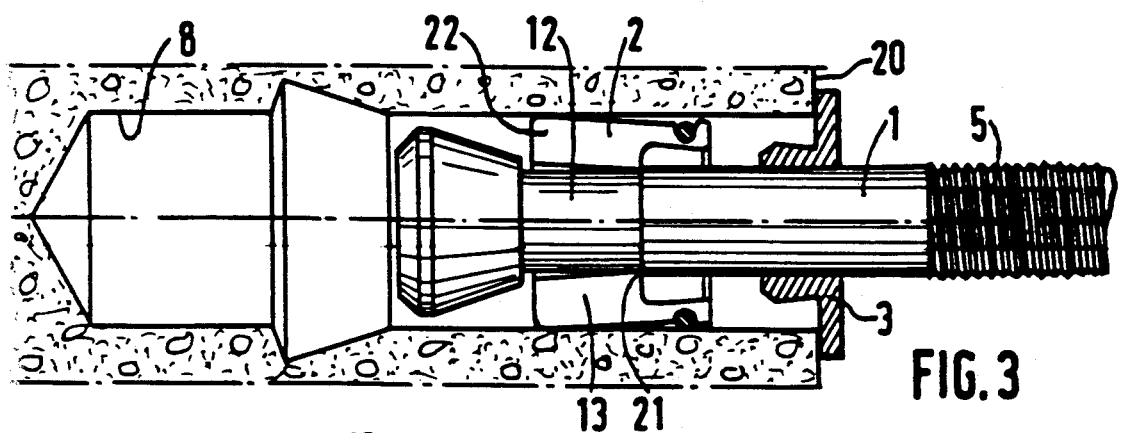
FIG. 3 is a view of the peg of FIG. 1, inserted further into the anchorage hole than in FIG. 2.

The anchorage operation of the peg is achieved by initially inserting the peg into the hole 8 by means of its bell-mouth end 11 until the washer 18 of collar 3 abuts against the edge 20 of hole 8 (FIG. 2). Then, by pushing the external threaded end 5 of peg body 1 in the direction of insertion of the peg into the hole 8 of the material 7, the peg is driven into hole 8 as a result of which collar 3 remains in abutment against the edge 20 of hole 8, ring 2 follows the movement of the body 1 as a result of the engagement of the radial annular shoulder 21 formed by means of the narrowed portion 12 of body 1 with respect to the rest of the body, with an internal crown of the internal portion 13 of the ring, after the ring has been detached from collar 3 against the action of annulus 4, the resilient annulus causing the elements of ring 2 to pivot until the internal ends 22 of such elements abut against the wall of the anchorage hole 8 (FIG. 3).

Figure 4:
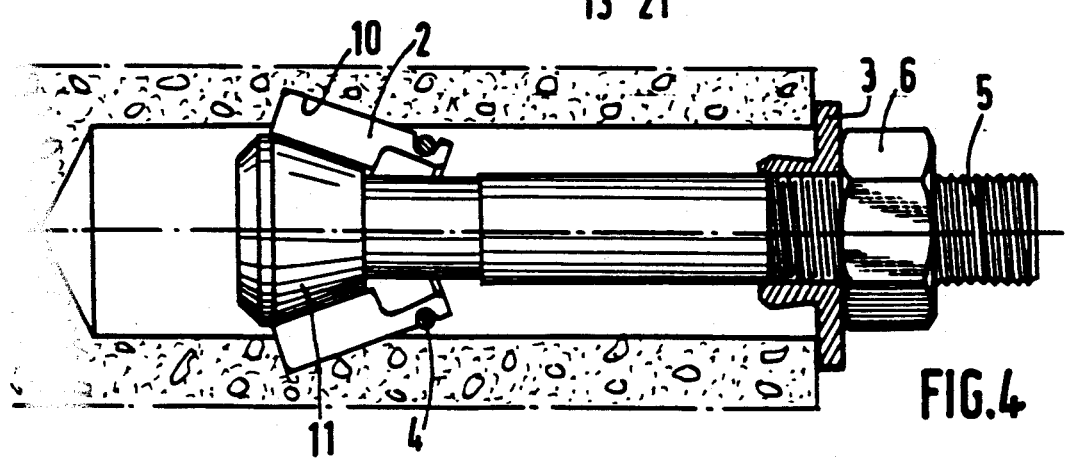
FIG. 4 is a view of the peg of FIG. 1, after locking thereof within the anchorage hole.

When the elements of ring 2 arrive at the level of the undercut portion 10, the ring elements 2 pivot into the undercut portion 10 under the influence of annulus 4. By means of nut 6 which is threadedly engaged upon the threaded end 5, and because nut 6 bears upon collar 3, the peg body 1 moves back in hole 8, that is, in the direction toward the open end of hole 8, until the tapered end 11, which had gone beyond the undercut portion 10, comes back in the opposite, direction so as to cooperate with the ring elements 2 and thereby expand ring 2 as much as possible so as to bias its elements against the wall of the undercut portion and thus lock the peg within hole 8 (FIG. 4).

In the embodiment which has just been described, collar is in actual fact formed by means of two half collars, as shown by means of the slit 23 in FIG. 1. As for slit 24, as shown in FIG. 1, it is the one which separates the four segments of ring 2, only two of which are shown in this same FIG. 1.

Variants of construction of the collar may be envisaged.

Figure 5:
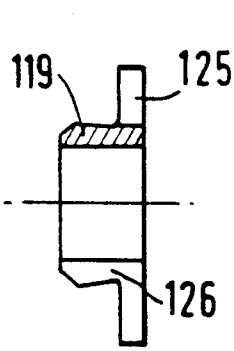
FIG. 5 is a sectional view of a first variant of the collar of the peg of FIG. 1.
Figure 6:
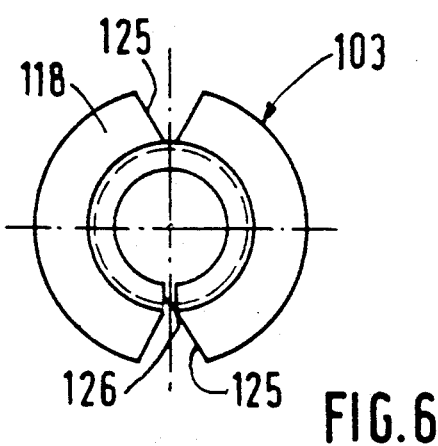
FIG. 6 is an end view of the collar of FIG. 5.

It may be made in one piece, with a washer 118 indented or grooved radially at both ends of the same diameter, as shown at 125 in FIG. 5 and 6, one of the two indentations being extended by means of a slit 126 also extending into skirt 119, so as to confer upon collar 103 a relative resilience in the circumferential direction (FIGS. 5, 6).

Figure 7:
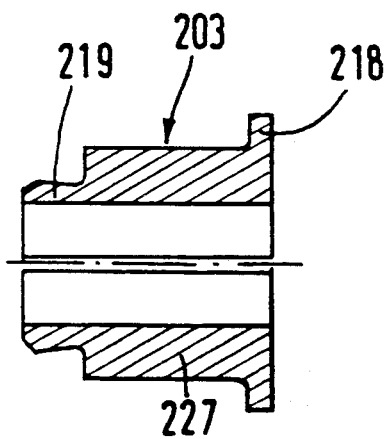
FIG. 7 is a sectional view of a second variant of the collar of the peg of FIG. 1.

Collar 203 may comprise, between its skirt 219 cooperating with ring 2 and its bearing washer 218, a ring 227 for centering the peg body within the anchorage hole as a result of having an external diameter equal to the diameter of the hole (FIG. 7).

Figure 8:
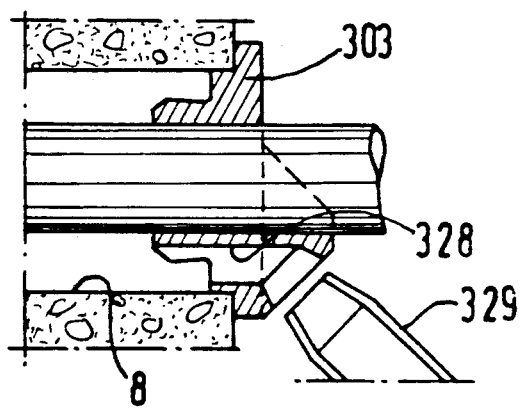
FIG. 8 is a sectional view of a third variant of the collar of the peg of FIG. 1.

Collar 303 may comprise an injection orifice 328 for filling the anchorage hole 8 with mortar, by means of a nozzle 329, after the peg has been locked within the hole 8 (FIG. 8).

Referring to FIGS. 9 to 12, a variant of the peg of the invention which is shown as being quite similar to that of the preceding Figures with, however, a few notable differences.

Figure 9:
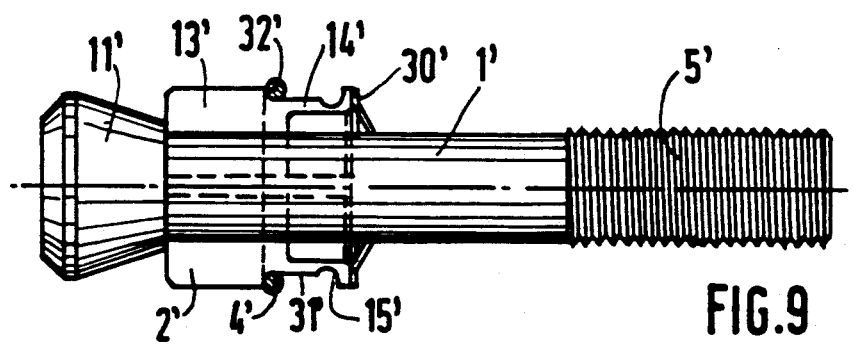
FIG. 9 is a view partially in longitudinal section of a second embodiment of the peg of the invention.
Figure 10:
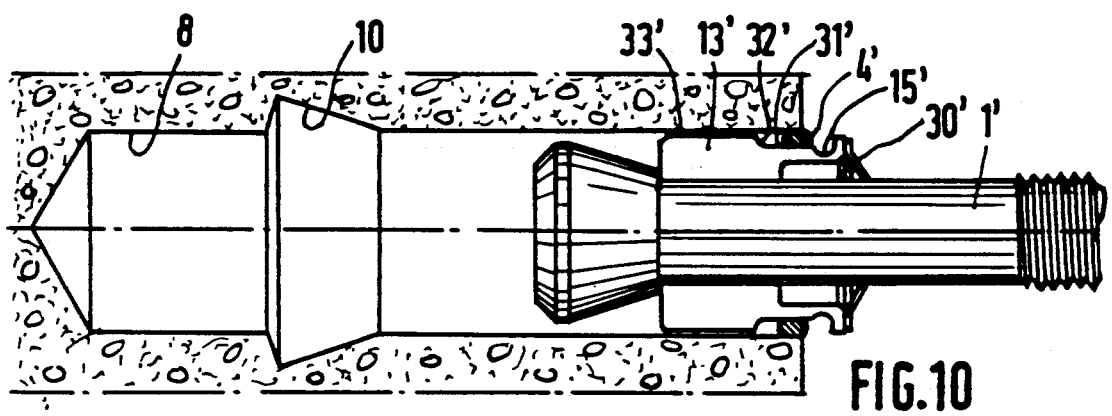
FIG. 10 is a view of the peg of FIG. 9 after it has been introduced into the anchorage hole, its resilient annulus nipped between the wall of the hole and its locking ring.

The diameter of peg body 1' is constant between its anchorage end 11' and its threaded end 5'. The function of shoulder 21 of the first embodiment now provided by means of a stop washer 30' fixed to the peg body 1'. In the example considered, it is a locking or self locking washer. There is no immobilization collar preventing expansion of the ring which is formed differently. Ring 2' of the peg of FIGS. 9 to 12 also has an internal portion 13', of an internal diameter equal to the external diameter of the peg body 1', disposed thereabout and axially extended by means of an external portion 14' whose internal diameter is greater than the external diameter of the peg body and which forms a skirt. Ring 2' comprises a portion having a reduced external diameter forming a cylindrical surface 31' extending partially over the internal portion 13' and over skirt 14', and from an annular shoulder 32', defined about the internal portion 13', and an annular groove 15' defined within the vicinity of the external end of the skirt 14'. In the storage and handling position, the resilient annulus 4' is received against shoulder 32'. In this position, the annulus 4' holds ring 2' immobilized axially upon the peg body 1', the internal wall of the internal portion 13' being clamped by means of annulus 4' against the peg body 1' (FIG. 9). The resilient annulus 4' has a thickness greater than the difference of the diameters of the external surfaces 31' of the ring and 33' of the internal portion 13', the diameter of the latter remaining substantially equal to that of the anchorage hole 8.

The resilient annulus 4' may be moved from its immobilized position, against the annular shoulder 32', to a pivoting position within groove 15'.

Figure 11:
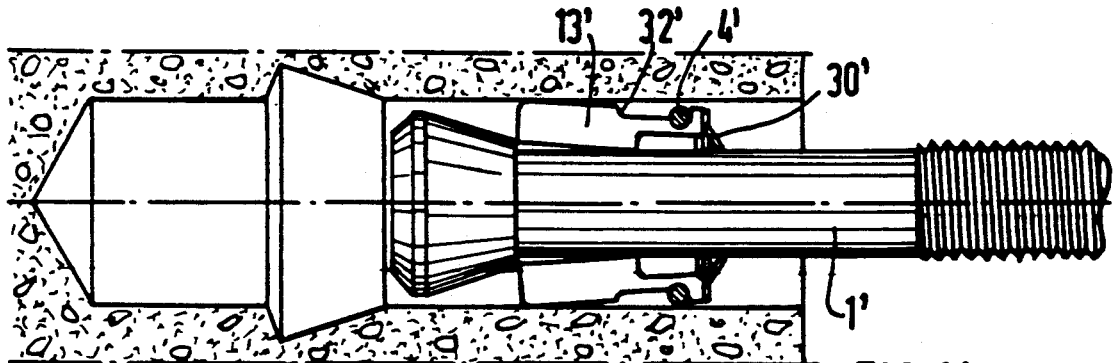
FIG. 11 is a view of the peg of FIG. 9, driven further into the anchorage hole than in FIG. 10, with its resilient annulus released and disposed within the pivoting groove.
Figure 12:
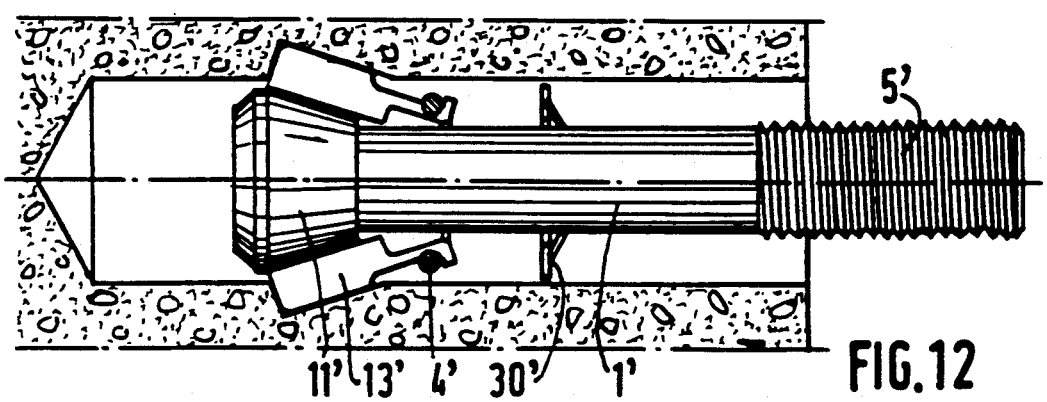
FIG. 12 is a view of the peg of FIG. 9 after locking thereof within the anchorage hole.

When the peg is inserted within the anchorage hole 8, because of the thickness of the resilient annulus 4', the latter is nipped and deformed between ring 2' and the wall of the hole 8 and thus immobilized (FIG. 10) until groove 15' reaches the axial position of annular 4' so as to receive it, and release it and allow it to resume its original shape. The continued movement of driving the peg into the hole 8 causes, under the action of washer 30', continuation of the movement of ring 2', with the resilient annulus 4' within groove 15' to a position at which annular 4' exerts its pivoting function upon the segments of ring 2' (FIG. 11). The expansion and locking of this variant of the peg takes place as before (FIG. 12).

Figure 13:
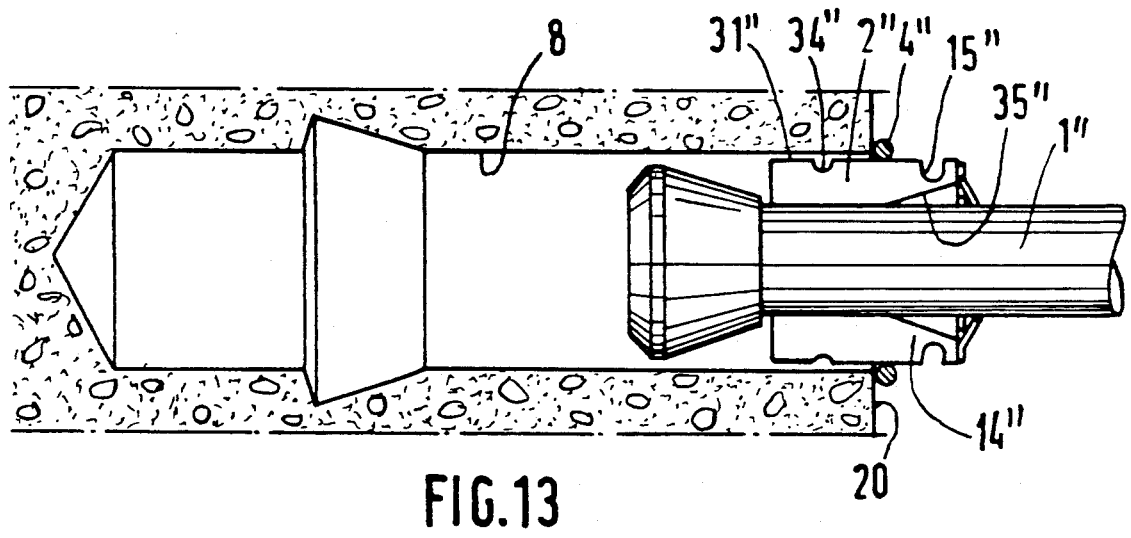
FIG. 13 is a view of the peg of FIG. 9, with a variant embodiment of the locking ring, after introduction into the anchorage hole.

In a variant of the embodiment of FIGS. 9 to 12, the ring 2" of peg body 1" of FIG. 13 has a continuous external surface 31" substantially of the same diameter as that of the anchorage hole 8, with a single groove 15", identical to groove 15', for receiving the resilient annulus 4" in the pivoted position, and a very fine or shallow groove 34" for receiving the annulus 4" in the immobilized position. Furthermore, the immobilization portion 14" of ring 2" no longer has the same shape but comprises an internal bore 35" which is no longer cylindrical but tapered and opening outwardly towards the threaded end of the peg body. It will be noted that this external portion form could have similarly been provided upon ring 2' of FIGS. 9 to 12. The positioning of the peg of FIG. 13 takes place substantially in the same way as before, except for a slight difference. Instead of being nipped between the wall of the hole and the ring, the resilient annulus 4" remains in abutment against edge 20 of the anchorage hole until groove 15" reaches its axial position.

Obviously, many modifications and variations of the present invention are possible in light of the above teachings. It is therefore to be understood that within the scope of the appended claims, the present invention may be practiced otherwise than as specifically described herein.

What is claimed is:

1. A peg for fixing an element upon a support surface by anchoring said peg within a bore, having a predetermined internal diameter, formed within said support surface, and wherein said bore includes an undercut portion having an internal diameter greater than said predetermined internal diameter of said bore, comprising:

a body having a first radially outwardly flared end adapted to be inserted within said bore of said support surface, and a second end adapted to project outwardly of said bore of said support surface so as to support said element to be fixed upon said support surface;

locking ring means pivotably mounted upon said body between a radially contracted non-locking state at which said locking ring means can engage internal wall portions of said bore having said predetermined internal diameter, and a radially expanded locking state for engaging said undercut portion of said bore when said locking ring means is disposed in said radially expanded locking state so as to lock said peg within said bore of said support surface; and means mounted upon said locking ring means for pivotably moving said locking ring means from said radially contracted non-locking state to said radially expanded locking state when said locking ring means is disposed at an axial position within said bore of said support surface which corresponds to the axial location of said undercut portion of said bore of said support surface;

said radially outwardly flared end of said body being engageable with said locking ring means as a result of axial movement of said body outwardly of said bore of said support surface so as to maintain said locking ring means lockingly engaged within said undercut portion of said bore.

2. A peg as set forth in claim 1, further comprising:

a stop washer fixedly secured to said peg body for axially moving said locking ring means axially within said bore of said support surface as said peg body is axially moved within said bore of said support surface.

3. A peg as set forth in claim 1, wherein:

said second end of said body comprises a threaded end portion for threadedly receiving a locking nut for securing said element upon said peg and said support surface.

4. A peg as set forth in claim 1, wherein:

said locking ring means comprises a plurality of segments circumferentially arranged about a longitudinal axis of said body.

5. A peg as set forth in claim 1, wherein:

said means mounted upon said locking ring means for pivotably moving said locking ring means comprises a resilient annulus.

6. A peg as set forth in claim 4, wherein:

each of said locking ring means segments comprises an axially internal portion engaged upon said body, and an axially external portion, comprising an annular skirt, radially spaced from said body when said locking ring means is disposed at said radially contracted non-locking state;

each of said locking ring means segments comprises a groove formed within said axially external skirt portion thereof; and said means mounted upon said locking ring means for pivotably moving said locking ring means comprises a resilient annulus disposed within said grooves of said segments which together form an annular groove for housing said resilient annulas.

7. A peg as set forth in claim 6, wherein:

said axially internal portion of each of said segments has an external diametrical dimension substantially equal to said predetermined internal diameter of said bore of said support surface, and said axially external skirt portion of each of said segments has an external diametrical dimension which is less than said external diametrical dimension of said axially internal portion of each of said segments such that an annular shoulder portion is defined between said axially internal portion and said axially external skirt portion of each of said segments for housing said resilient annulus during initial insertion of said peg body and said locking ring means into said bore of said support surface.

8. A peg as set forth in claim 6, comprising;

a second groove formed within each one of said locking ring means segments for housing said resilient annulus prior to and during initial insertion of said peg body and said locking ring mans into said bore of said support surface.

9. A peg as set forth in claim 6, comprising;

immobilization collar means mounted upon said peg body and engaged with said locking ring means for preventing pivotable movement of said locking ring means from said radially contracted non-locking state to said radially expanded locking state when said body and said locking ring means are initially inserted within said bore of said support surface.

10. A peg as set forth in claim 9, wherein:

said immobilization collar means comprises an injection orifice for permitting introduction of a filler material into said bore of said support surface after said peg has been locked within said bore of said support surface so as to additionally secure said peg within said bore of said support surface.

11. A peg as set forth in claim 9, wherein said immobilization collar means comprises:

a washer, having an external diameter greater than said predetermined internal diameter of said bore defined within said support surface, for engaging an outer wall portion of said support surface; and, an axially extending annular skirt portion, integral with said washer, for disposition within an annular space defined between said annular skirt portion of said locking ring means and said body.

12. A peg as set forth in claim 11, wherein said immobilization collar means further comprises:

a centering annulus portion, axially interposed between said washer and said skirt portion and integrally formed with said washer and said skirt portion, for centering said peg body within said bore of said support surface.

13. A peg as set forth in claim 12, wherein:

said immobilization collar means has a stepped configuration as seen in axial cross-section with external diameter dimensions of said washer, said centering portion, and said skirt portion, being of progressively reduced values.

* * * * *